US009236779B2

(12) United States Patent
Miyagawa et al.

(10) Patent No.: US 9,236,779 B2
(45) Date of Patent: Jan. 12, 2016

(54) ROTATION MAINTAINING DEVICE (71) Applicant: Simple Tokyo Co., Ltd., Tokyo (JP)

(72) Inventors: Megumi Miyagawa, Tokyo (JP); Keiko Kondo, Tokyo (JP)

(73) Assignee: Simple Tokyo Co., Ltd, Tokyo (JP)

( * ) Notice: Subject to any disclaimer, the term of this patent is extended or adjusted under 35 U.S.C. 154(b) by 0 days.

(21) Appl. No.: 14/334,871

(22) Filed: Jul. 18, 2014

(65) Prior Publication Data
US 2015/0040717 A1 Feb. 12, 2015

(30) Foreign Application Priority Data

Aug. 12, 2013 (JP) ................. 2013-167390

(51) Int. Cl.
*H02K 7/02* (2006.01)
*F03G 7/10* (2006.01)
(52) U.S. Cl.
CPC ........... *H02K 7/025* (2013.01); *F03G 7/10* (2013.01); *Y10T 74/2119* (2015.01)
(58) Field of Classification Search
CPC ...... H02K 7/025; F03G 7/10; Y10T 74/2117; Y10T 74/2119; Y10T 74/2121; Y10T 74/2128
USPC ................... 74/572.1, 572.11, 574.2, 574.21; 310/74; 322/4
See application file for complete search history.

(56) References Cited

U.S. PATENT DOCUMENTS

| | | | |
|---|---|---|---|
| 6,382,050 B1 * | 5/2002 | Carlson et al. ............... | 74/570.2 |
| 8,850,927 B2 * | 10/2014 | Kinoshita et al. ............ | 74/574.4 |
| 2015/0167779 A1 * | 6/2015 | Ulbrich et al. ............... | 74/574.2 |

FOREIGN PATENT DOCUMENTS

| | | |
|---|---|---|
| JP | 8-61214 | 3/1996 |
| JP | 2013-024233 | 2/2013 |
| JP | 2013-137011 | 7/2013 |

OTHER PUBLICATIONS

Oct. 10, 2014 Communication from the EPO.
Christopher Wadlow "Patents for perpetual motion machines", Journal of IntellectualProperty Law & Practice, Oxford University Press, Oxford GB, vol. 2, No. 3, Jan. 1, 2007, pp. 136-144, XP007910392, ISSN:1747-1532, DOI:10,1093/JIPLP/JPL242 [retrieved on Feb. 6, 2007].
Hume A W J G Ed-Ord-Hume, A: "Perpetual Motion: The history of an obsession; What is Perpetual Motion?", Jan. 1, 1994, Perpetual Motion. History of an Obsession, New York, St. Martin's Press, US, p. 1940, XP002291107.
Hume A W J G Ed- Ord-Hume A: A Perpetual Motion: This listory of an obsession; Jan. 1, 1994, Perpetual Motion. History of an Obsession, New York, St. Martin's Press US, pp. 19-40, XP002106851.
Angrist S W: "Perpetual Motion Machines", Scientific American, Scientific American Inc., New York, NY, US, vol. 218, No. 1, Jan. 1, 1968, pp. 114-122, XP002036811, ISSN: 0036-8733.

* cited by examiner

*Primary Examiner* — Adam D Rogers
(74) *Attorney, Agent, or Firm* — Frommer Lawrence & Haug LLP (57) ABSTRACT

A rotatable output shaft, a rotatable rotary plate member coupled with the output shaft, rotary weight members supported by the rotary plate member, a guide member fixed in motionless condition having a partially arc shape at a side where the rotary weight members rise, and rotation engagement members pivotally supported by the rotary place member are provided. Each of the rotary weight members includes a circular plate section, and a weight section fixed to the circular plate section to bias a position of the center of gravity of each rotary weight member from the axis of the circular plate section. Each of the rotary weight members is adapted to rotate in one direction when an outer circumference side surface of the circular plate section is driven by the outer circumference side surface of each rotation engagement member.

7 Claims, 6 Drawing Sheets

ROTATION MAINTAINING DEVICE

BACKGROUND OF THE INVENTION

1. Field of the Invention

The present invention relates to a rotation maintaining device capable of keeping rotation of its output shaft over a long time.

2. Description of the Related Art

Expected has been a rotational mechanism capable of retaining its rotational energy with the smallest loss to utilize it in a power generation system or other various systems.

Japanese Patent Publication No. 1996-061214A describes an example of the rotation retaining mechanism for keeping its turn as long time as possible.

This rotation retaining mechanism has a shaft of rotation, a rotor provided with radial arms and attached to the rotation shaft, long slide weights freely movable along the respective arms of the rotor, and a circular guide for eccentrically rotating the slide weights with respect to the center of the rotation shaft.

The rotation retaining mechanism described in Japanese Patent Publication No. 1996-061214A intends to turn its rotation shaft based upon the principle of leverage in which a rotational moment of the slide weight moving downwardly becomes larger than a rotational moment of the other slide weight moving upwardly, caused by decentering the rotational orbits of the slide weights with respect to the center of the rotation shaft.

Inventors of this application had been prepared and tested devices similar to the rotation retaining mechanism described in Japanese Patent Publication No. 1996-061214A in order to develop a rotation retaining device capable of keeping its rotation over a long time. However, according to such devices, it was impossible to keep the rotation for many hours.

According to the consideration of the inventors, it became apparent that, in the rotation retaining mechanism described in Japanese Patent Publication No. 1996-061214A, a rotational angle rate of the slide weights caused by the difference between the rotational moments is decreased due to the friction between the slide weights and the circular guide, and this decreasing speed of the angle rate is fast in comparison with the amount of the angle rate. Thus, such rotation retaining mechanism cannot keep the rotation for many hours.

Under these circumstances, the inventors of this application have investigated and studied to provide a new rotation retaining device capable of keeping rotation of its output shaft over a long time, by reducing the friction between members as much as possible and by keeping the difference between the rotational moments as long time as possible.

SUMMARY OF THE INVENTION

It is therefore an object of the present invention to provide a rotation maintaining device capable of maintaining its rotation over a long time, the maintained rotation being not less than a rate at which the device can be used in various systems.

According to the present invention, a rotation maintaining device includes a rotatable output shaft pivotally supported and provided with an axis running along a horizontal direction that is vertical to a direction of force of gravity, a rotatable rotary plate member concentrically coupled with the output shaft, a plurality of rotary weight members pivotally supported by the rotary plate member at positions near peripheral edge of the rotary plate member, respectively, so as to rotate around pivoted axes in only one direction, a guide member fixed in motionless condition to position coaxial with the output shaft, and provided with a peripheral side surface having a partially arc shape only on its one side where the rotary weight members rise when the rotary plate member rotates, and a plurality of rotation engagement members pivotally supported by the rotary plate member so as to rotate around pivoted axes, when outer circumference side surfaces of the rotation engagement members engage with and are guided by the partially arc shaped peripheral side surface of the guide member. Each of the rotary weight members includes a circular plate section having a rotational axis coaxial with the axis of the rotary weight member, and a weight section fixed to the circular plate section to bias a position of the center of gravity of the rotary weight member from the axis of the circular plate section. Each of the rotary weight members is adapted to rotate in the one direction when an outer circumference side surface of the circular plate section is engaged with and driven by the outer circumference side surface of the rotation engagement member.

The output shaft keeps its rotation by inertial rotational power of the rotary plate member. Since the plurality of rotary weight members pivotally supported by the rotary plate member rotate around the supported axes due to the rotation of the rotary plate member, distances between the centers of gravity position of the respective rotary weight members and the axis center of the output shaft change and thus the rotational moment changes. More concretely, the rotational moment changes so that the rotational moment for lowering the rotary weight members from the upper side to the lower side becomes larger than the rotational moment for rising the same from the lower side to the upper side. That is, the guide member has a peripheral side surface with a partially arc shape only in the side where the rotary weight members rise due to the rotation of the rotary plate member, and therefore the rotation engagement members rotate only when this peripheral side surface engage therewith for rotating the rotary weight members so as to shorten the distances between the centers of gravity position of the rotary weight members and the axis center of the output shaft, resulting the rotational moment during rising to decrease. On the other hand, because the guide member has no peripheral side surface in the side where the rotary weight members fall due to the rotation of the rotary plate member. Thus, the rotary weight members never rotate by means of the rotation engagement members but try to rotate in the opposite direction due to their own weight. However, because the rotary weight members are adapted to rotate only in one direction, they never rotate. Therefore, long distances are kept between the centers of gravity position of these rotary weight members and the axis center of the output shaft to occur and maintain a big rotational moment during falling. As described, the rotation maintaining device according to the present invention produces a difference between the lowering rotational moment and the rising rotational moment so that the rotational moment for lowering the rotary weight members from the upper side to the lower side becomes larger than the rotational moment for rising the same from the lower side to the upper side. Also, a friction loss of the rotation maintaining device is extremely small because there exists no linear sliding portion in the device. Therefore, it is possible to effectively utilize the difference in the rotational moments for maintaining the rotation without negatively affected by the friction loss. As a result, the rotation maintaining device according to the present invention can keep the rotation for an extended time period.

It is preferred that each of the rotary weight members is adapted to rotate by the driving of each of the rotation engagement members when the rotary weight member rises due to rotation of the rotary plate member, and that each of the rotary weight members is adapted not to rotate when the rotary weight member falls due to rotation of the rotary plate member.

It is also preferred that the device is adapted that a position of the center of gravity of the rotary weight member during rising is nearer to a rotation axis of the rotary plate member than a position of the center of gravity of the rotary weight member during falling.

It is further preferred that each of the rotary weight members is pivotally attached to the rotary plate member by means of a one-way bearing mechanism that allows to rotate only in one direction.

It is still further preferred that each of the rotary weight members further includes an additional weight fixed to the weight section of the rotary weight member, for further biasing the positions of the center of gravity of the rotary weight member.

It is further preferred that the device includes a pair of the rotary plate members concentrically coupled with the output shaft and a pair of the guide members fixed in motionless condition, and that the plurality of rotary weight members and the plurality of rotation engagement members are pivotally supported by each of the rotary plate members, respectively.

It is further preferred that the device further includes a flywheel mechanism concentrically coupled with the output shaft at a position between the pair of rotary plate members.

Further objects and advantages of the present invention will be apparent from the following description of the preferred embodiments of the invention as illustrated in the accompanying drawings.

DESCRIPTION OF THE PREFERRED EMBODIMENTS

FIGS. 1 to 5 schematically illustrate configuration of an embodiment of the rotation maintaining device according to the present invention.

Figure 1:
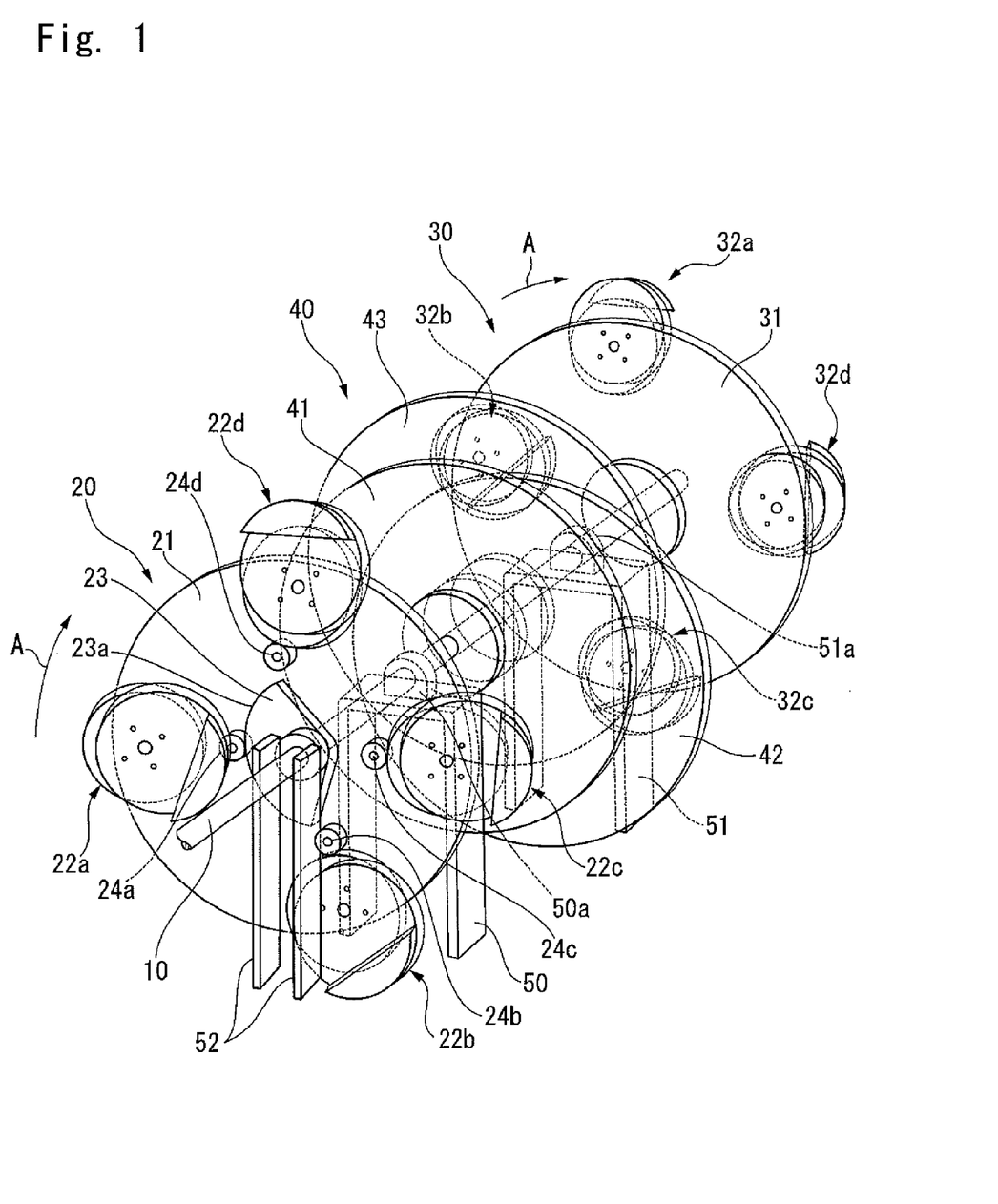
FIG. 1 is a perspective view of an embodiment of a rotation maintaining device according to the present invention.
Figure 2:
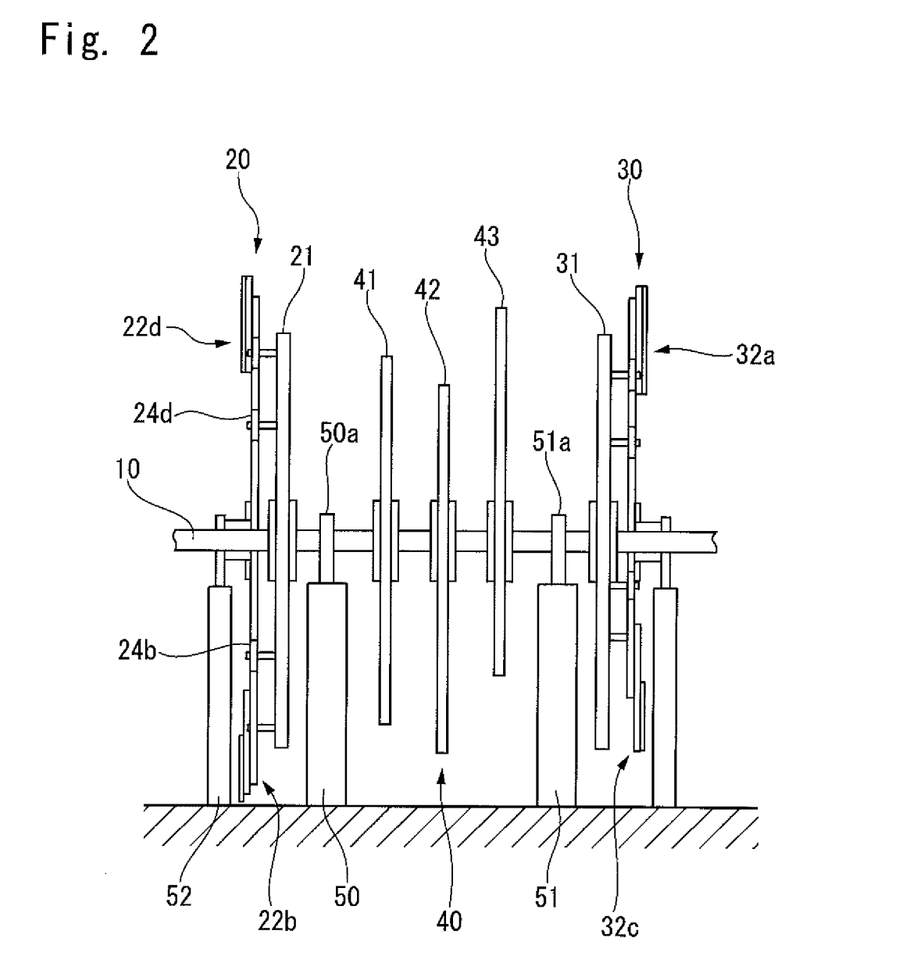
FIG. 2 is a side view of the rotation maintaining device shown in FIG. 1.
Figure 3:
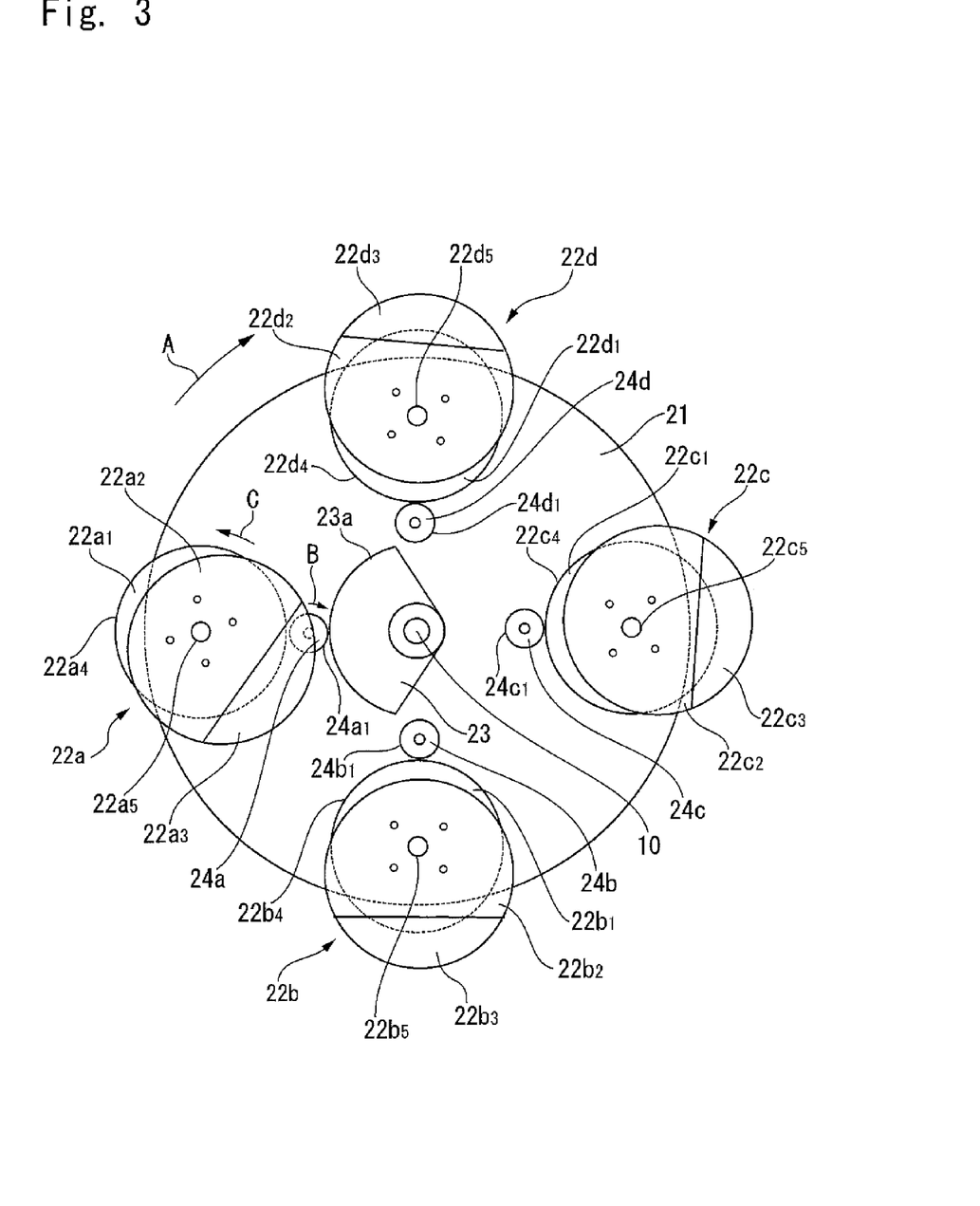
FIG. 3 is an elevation view for illustrating operations of a guide member, rotary engagement members and rotary weight members of the rotation maintaining device shown in FIG. 1.

As shown in FIGS. 1 to 3, the rotation maintaining device of this embodiment has a rotatable output shaft 10 with an axis running along a horizontal direction that is vertical to the direction of gravitational force, a first rotation keeping mechanism 20 concentrically coupled with this output shaft 10, a second rotation keeping mechanism 30 concentrically coupled with the output shaft 10 and provided with structure that is inverted from structure of the first rotation keeping mechanism 20, and a flywheel mechanism 40 concentrically coupled with the output shaft 10 at a position between the first rotation keeping mechanism 20 and the second rotation keeping mechanism 30. In this embodiment, the rotation maintaining device is adapted to rotate in one direction shown by an arrow A (clockwise direction in FIG. 3).

The first rotation keeping mechanism 20 has a rotary plate member 21, four rotary weight members 22a-22d, a guide member 23 and four rotation engagement members 24a-24d. The rotary plate member 21 is rotatable and concentrically coupled with the output shaft 10. The rotary weight members 22a-22d are pivotally supported by the rotary plate member 21 so as to rotate around the pivoted axes. These rotary weight members 22a-22d are disposed at positions near the peripheral edge of the rotary plate member 21, respectively, which positions are separated with each other by a predetermined angle (90 degrees in this embodiment). The guide member 23 is formed in a substantially fan shape and fixed to a support 52 in motionless condition (resting condition) so as to position coaxial with the output shaft 10. The guide member 23 also has a peripheral side surface 23a with a partially arc shape only on its one side where the rotary weight members 22a-22d rise when the rotary plate member 21 rotates. The rotation engagement members 24a-24d are pivotally supported by the rotary plate member 21 so as to rotate (in a clockwise direction shown by an arrow B in FIG. 3) around the pivoted axes when their outer circumference side surfaces $24a_1$-$24d_1$ engage with and are guided by the peripheral side surface 23a with the partially arc shape of the guide member 23.

As shown in FIG. 3, the four rotary weight members 22a-22d have four circular plate sections $22a_1$-$22d_1$ and four weight sections $22a_2$-$22d_2$, respectively. The circular plate sections $22a_1$-$22d_1$ have rotational axes that are coaxial with the axes of these rotary weight members 22a-22d, respectively. The weight sections $22a_2$-$22d_2$ are fixed to the circular plate sections $22a_1$-$22d_1$ by bolts so as to bias positions of the center of gravity of the rotary weight members 22a-22d from the axes of the circular plate sections $22a_1$-$22d_1$, respectively. Four additional weights $22a_3$-$22d_3$ for further biasing the positions of the center of gravity of the rotary weight members 22a-22d are fixed to the four weight sections $22a_2$-$22d_2$, respectively. These rotary weight members 22a-22d are adapted to rotate when outer circumference side surfaces $22a_4$-$22d_4$ of the circular plate sections $22a_1$-$22d_1$ are engaged with and driven by the outer circumference side surfaces $24a_1$-$24d_1$ of the rotation engagement members 24a-24d, respectively. Also, the rotary weight members 22a-22d are adapted to rotate in only one direction (in a counterclockwise direction shown by an arrow C in FIG. 3) because they are pivotally attached to the rotary plate member 21 by means of one-way bearing mechanisms $22a_5$-$22d_5$, respectively.

Structure of the second rotation keeping mechanism 30 is plane-symmetrical with respect to that of the first rotation keeping mechanism 20. That is, the second rotation keeping mechanism 30 has a rotary plate member 31, four rotary weight members 32a-32d, a guide member (not shown) and four rotation engagement members (not shown). The rotary plate member 31 is rotatable and concentrically coupled with the output shaft 10. The rotary weight members 32a-32d are pivotally supported by the rotary plate member 31 so as to rotate around the pivoted axes. These rotary weight members 32a-32d are arranged at positions near the peripheral edge of the rotary plate member 31, respectively, which positions are separated with each other by a predetermined angle (90 degrees in this embodiment). The guide member is formed in a substantially fan shape and fixed to a support 52 in motionless condition so as to position coaxial with the output shaft 10. The guide member also has a peripheral side surface with a partially arc shape on its one side only where the rotary weight members 32a-32d rise when the rotary plate member 31 rotates. The rotation engagement members are pivotally supported by the rotary plate member 31 so as to rotate around the pivoted axes when their outer circumference side surfaces engage with and are guided by the peripheral side surface with the partially arc shape, of the guide member.

Detail configurations of the four rotary weight members 32a-32d of the second rotation keeping mechanism 30 is the same as that of the four rotary weight members 22a-22d of the first rotation keeping mechanism 20.

The flywheel mechanism 40 in this embodiment is adapted to have three flywheels 41, 42 and 43 eccentrically connected with each other to the output shaft 10 so that positions of the center of gravity of the respective flywheels are biased from the axis of the output shaft 10. However, the center of gravity of the total of these three flywheels 41, 42 and 43 positions at the axis of output shaft 10. In modifications, the flywheel mechanism 40 may be configured by three flywheels concentrically coupled with the output shaft 10, or by a single flywheel concentrically coupled with the output shaft 10.

Hereinafter, configurations of each element in the rotation maintaining device in this embodiment will be described more specifically.

The output shaft 10 is, for example, a rotatable shaft made of steel and supported to smoothly rotate by bearings 50a and 51a placed on supports 50 and 51 of metal frame, respectively.

The rotary plate member 21 of the first rotation keeping mechanism 20 is formed from a circular iron or steel plate with an outer diameter of approximately 1000-2000 mm φ, and mechanically fixed to the output shaft 10 by bolts or other means. The circular plate sections $22a_1$-$22d_1$ of the rotary weight members 22a-22d are formed from circular iron or steel plates with a diameter smaller than that of the rotary plate member 21 and pivotally attached to the rotary plate member 21 by the one-way bearing mechanism $22a_5$-$22d_5$, respectively. The weight sections $22a_2$-$22d_2$ of the rotary weight members 22a-22d are formed from circular iron or steel plates with a diameter slightly larger than that of the circular plate sections $22a_1$-$22d_1$, and eccentrically attached to these circular plate sections $22a_1$-$22d_1$ by bolts or other means, respectively. The additional weights $22a_3$-$22d_3$ of the rotary weight members 22a-22d are formed from iron or steel plates with a partially-cut arc shape, and have the same curvature radius as the weight sections $22a_2$-$22d_2$. These additional weights $22a_3$-$22d_3$ are attached to the weight sections $22a_2$-$22d_2$ by bolts or other means so that their circumferential edges conform to these of the weight sections $22a_2$-$22d_2$, respectively.

The guide member 23 of the first rotation keeping mechanism 20 is formed from a nearly fan-shaped iron or steel plate and fixed to the support 52 made of a metal frame in motionless condition so as to position coaxial with the output shaft 10.

The rotation engagement members 24a-24d of the first rotation keeping mechanism 20 are configured by circular tires, at least outer periphery of each of the circular tires being made of a rubber material. These rotation engagement members 24a-24d are pivotally supported by bearings (not shown) so as to smoothly rotate, respectively.

The rotary plate member 31 of the second rotation keeping mechanism 30 is formed from a circular iron or steel plate with an outer diameter of approximately 1000-2000 mm φ, and mechanically fixed to the output shaft 10 by bolts or other means. Configurations of the rotary weight members 32a-32d, a guide member and rotation engagement members of the second rotation keeping mechanism 30 are similar to these of the rotary weight members 22a-22d, the guide member 23 and the rotation engagement members 24a-24d. Therefore, illustration of the guide member, its support and the rotation engagement members is omitted.

The flywheels 40, 41 and 42 of the flywheel mechanism 40 are formed from circular iron or steel plates with an outer diameter of approximately 1000-2000 mm φ, respectively.

Hereinafter, operations and functions of the rotation maintaining device in this embodiment will be described with reference to FIGS. 3 to 5.

Note that the following is described only for the first rotation keeping mechanism 20 because operation of the second rotation keeping mechanism 30 is similar to that of the first rotation keeping mechanism 20 except that rotating direction thereof is reversed with respect to that of the first rotation keeping mechanism 20. The rotation maintaining device of this embodiment is configured to rotate in a clockwise direction shown by an arrow A in FIG. 3.

When initially driven by an electric motor or manual operation, the output shaft 10 and the rotary plate member 21 rotate in the clockwise direction shown by arrow A.

In case that the rotary weight members 22b-22d are in a state shown in FIG. 3, that is, in case that the rotary weight member 22d stays at an upper position and will fall from now, that the rotary weight member 22c is falling, and that the rotary weight member 22b stays at an lower position and will complete its falling, these rotary weight members 22b-22d are not rotationally driven by the rotation engagement members 24b-24d, respectively. Thus, the rotary weight members 22b-22d will try to rotate in the clockwise directions due to the gravity caused by the deviation of the center of gravity position, respectively. However, since these rotary weight members 22b-22d are configured to rotate only in the counterclockwise direction by means of the one-way bearing mechanism $22b_5$-$22d_5$, their rotations in the clockwise direction are blocked. Therefore, long distances are kept between the centers of gravity position of these rotary weight members 22b-22d and the axis center of the output shaft 10 resulting occurrence of a big rotational moment to accelerate the rotation of the output shaft 10 and the rotary plate member 21. On the other hand, the rotary weight member 22a is in this case rising. Since the outer circumference side surface $24a_1$ of the rotation engagement member 24a abuts and slides along the peripheral side surface 23a with a partially arc shape of the guide member 23 to rotate the rotation engagement member 24a in the clockwise direction B, the rotary weight member 22a rotates in the counterclockwise direction C. Therefore, a distance between the center of gravity position of the rotary weight member 22a and the axis center of the output shaft 10 is shortened resulting decreasing of the rotational moment to reduce a force for attenuating the rotation of the output shaft 10 and the rotary plate member 21.

Figure 4:
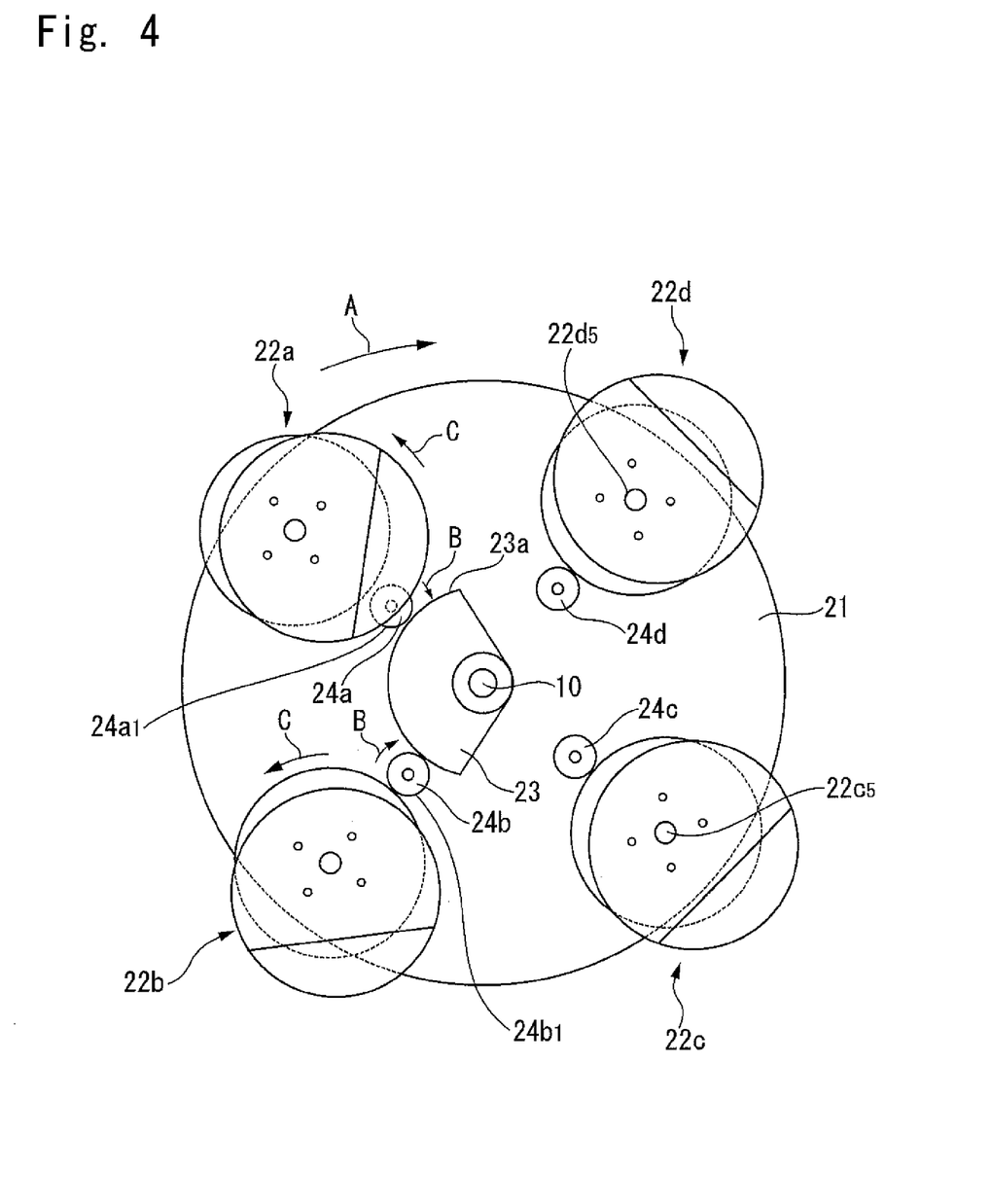
FIG. 4 is an elevation view for illustrating operations of the guide member, the rotary engagement members and the rotary weight members of the rotation maintaining device shown in FIG. 1.

In case that the output shaft 10 and the rotary plate member 21 further rotate and the rotary weight members 22a-22d are in a state shown in FIG. 4, that is, in case that the rotary weight members 22d and 22c are falling, these rotary weight members 22d and 22c are not rotationally driven by the rotation engagement members 24d and 24c, respectively. Thus, the rotary weight members 22d and 22c will try to rotate in the clockwise directions due to the gravity caused by the deviation of the center of gravity position, respectively. However, since these rotary weight members 22d and 22c are configured to rotate only in the counterclockwise direction by means of the one-way bearing mechanism $22d_5$ and $22c_5$, their rotations in the clockwise direction are blocked. Therefore, long distances are kept between the centers of gravity position of these rotary weight members 22d and 22c and the axis center of the output shaft 10 resulting occurrence of a big rotational moment to accelerate the rotation of the output shaft 10 and the rotary plate member 21. On the other hand, the rotary weight members 22b and 22a are in this case rising. Since the outer circumference side surfaces $24b_1$ and $24a_1$ of the rotation engagement members 24b and 24a abut and slide along the peripheral side surface 23a with a partially arc shape of the guide member 23 to rotate the rotation engagement members 24b and 24a in the clockwise direction B, the rotary weight members 22b and 22a rotate in the counterclockwise direction C, respectively. Therefore, distances between the centers of gravity position of the rotary weight members 22b and 22a and the axis center of the output shaft 10 are shortened resulting decreasing of the rotational moment to reduce a force for attenuating the rotation of the output shaft 10 and the rotary plate member 21.

Figure 5:
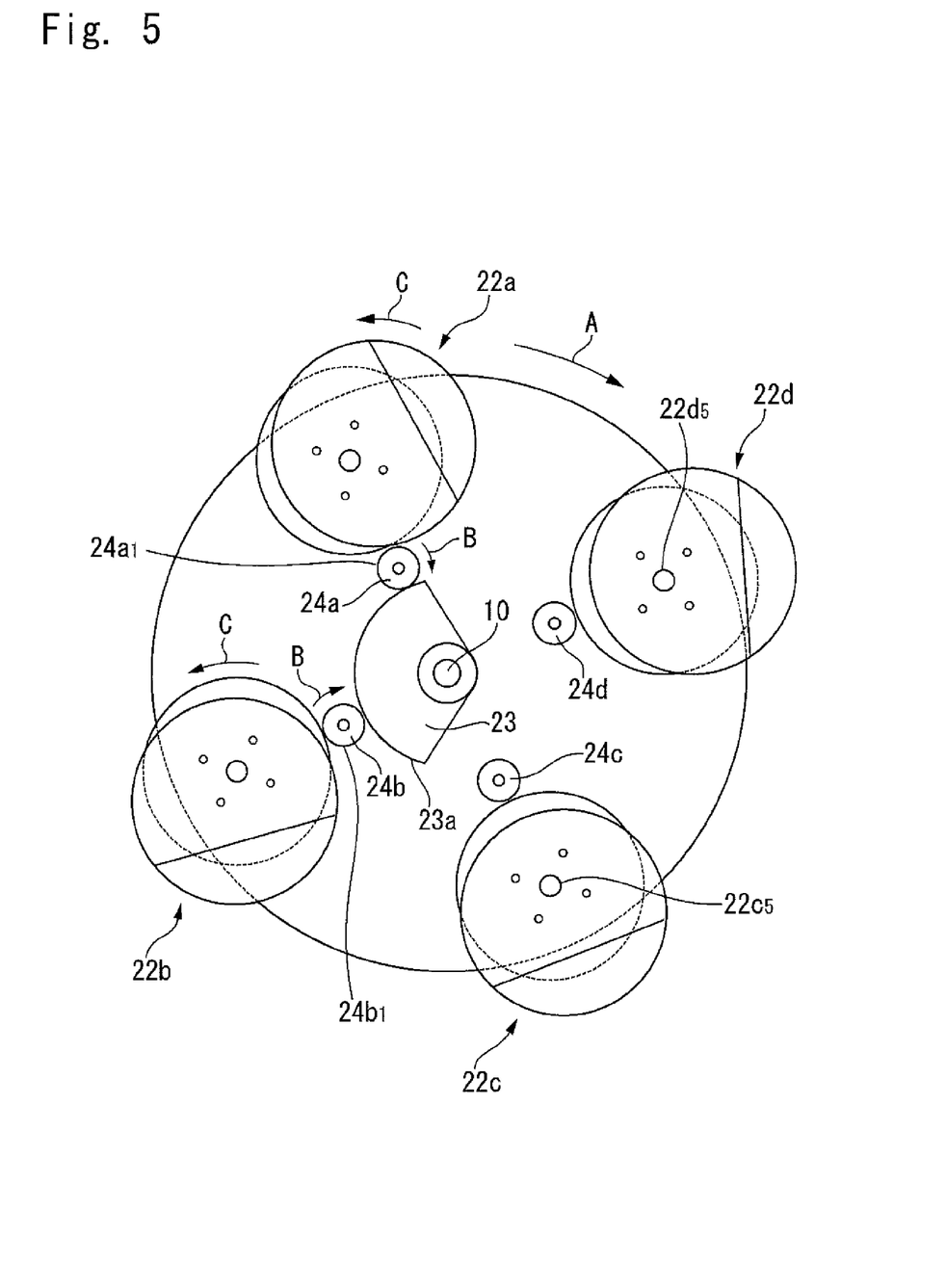
FIG. 5 is an elevation view for illustrating operations of the guide member, the rotary engagement members and the rotary weight members of the rotation maintaining device shown in FIG. 1.

In case that the output shaft 10 and the rotary plate member 21 still further rotate and the rotary weight members 22a-22d are in a state shown in FIG. 5, that is, in case that the rotary weight members 22d and 22c are further falling, these rotary weight members 22d and 22c are not rotationally driven by the rotation engagement members 24d and 24c, respectively. Thus, the rotary weight members 22d and 22c will try to rotate in the clockwise directions due to the gravity caused by the deviation of the center of gravity position, respectively. However, since these rotary weight members 22d and 22c are configured to rotate only in the counterclockwise direction by means of the one-way bearing mechanism $22d_5$ and $22c_5$, their rotations in the clockwise direction are blocked. Therefore, long distances are kept between the centers of gravity position of these rotary weight members 22d and 22c and the axis center of the output shaft 10 resulting occurrence of a big rotational moment to accelerate the rotation of the output shaft 10 and the rotary plate member 21. On the other hand, the rotary weight members 22b and 22a are in this case rising. Since the outer circumference side surfaces $24b_1$ and $24a_1$ of the rotation engagement members 24b and 24a abut and slide along the peripheral side surface 23a with a partially arc shape of the guide member 23 to rotate the rotation engagement members 24b and 24a in the clockwise direction B, the rotary weight members 22b and 22a rotate in the counterclockwise direction C, respectively. Therefore, distances between the centers of gravity position of the rotary weight members 22b and 22a and the axis center of the output shaft 10 are shortened resulting decreasing of the rotational moment to reduce a force for attenuating the rotation of the output shaft 10 and the rotary plate member 21.

In case that the output shaft 10 and rotary plate member 21 further rotate, the rotary weight members 22a-22d are in the state shown in FIG. 3 but the reference numerals of the elements are shifted in sequence, in which the same operations and functions as these in the above described explanation are provided.

As discussed above, according to the rotation maintaining devise of this embodiment, the rotational moment changes so that the rotational moment for lowering the rotary weight members 22a-22d from the upper side to the lower side becomes larger than the rotational moment for rising the same from the lower side to the upper side. That is, the guide member 23 has the peripheral side surface 23a with the partially arc shape only in the side where the rotary weight members 22a-22d rise due to the rotation of the rotary plate member 21. Thus, the rotation engagement members 24a-24d rotate only when this peripheral side surface 23a engage therewith for rotating the rotary weight members 22a-22d so as to shorten the distances between the centers of gravity position of the rotary weight members 22a-22d and the axis center of the output shaft 10, resulting the rotational moment during rising to decrease. On the other hand, because the guide member 23 has no peripheral side surface 23a in the side where the rotary weight members 22a-22d fall due to the rotation of the rotary plate member 21. Thus, the rotary weight members 22a-22d never rotate by means of the rotation engagement members 24a-24d but try to rotate in the opposite direction due to their own weight. However, because the rotary weight members 22a-22d are adapted to rotate only in one direction by means of the one-way bearing mechanisms, they never rotate. Therefore, long distances are kept between the centers of gravity position of these rotary weight members 22b-22d and the axis center of the output shaft 10 to occur and maintain a big rotational moment during falling. As described, the rotation maintaining device of this embodiment produces a difference between the lowering rotational moment and the rising rotational moment so that the rotational moment for lowering the rotary weight members 22a-22d from the upper side to the lower side becomes larger than the rotational moment for rising the same from the lower side to the upper side. Also, a friction loss of the rotation maintaining device of this embodiment is extremely small because there exists no linear sliding portion in the device. Therefore, it is possible to effectively utilize the difference in the rotational moments for maintaining the rotation without negatively affected by the friction loss. As a result, according to the rotation maintaining device of this embodiment, it is possible to keep the rotation for an extended time period.

It should be noted that the rotation maintaining device of this embodiment has the first rotation keeping mechanism 20, the second rotation keeping mechanism 30 and the flywheel mechanism 40 to maintain the turn more smoothly. However, it is possible to have a third rotation keeping mechanism with the similar configuration as that of the first rotation keeping mechanism 20. Also, the number of the rotary weight members is not limited to four, but may be any number more than two. In the latter case, the number of the guide members may be conformed with the number of the rotary weight members.

In the above-mentioned embodiment, the structure of the second rotation keeping mechanism 30 is inverted from the structure of the first rotation keeping mechanism 20 in reference to the output shaft 10. However, the second rotation keeping mechanism 30 may have a structure inverted and deviated by an optional angle from the structure of the first rotation keeping mechanism 20.

Furthermore, although the supports 50-52 are formed from metal frames in the above-mentioned embodiment, these may be formed from another material frames in modifications. For example, the supports may be made of concrete material.

Figure 6:
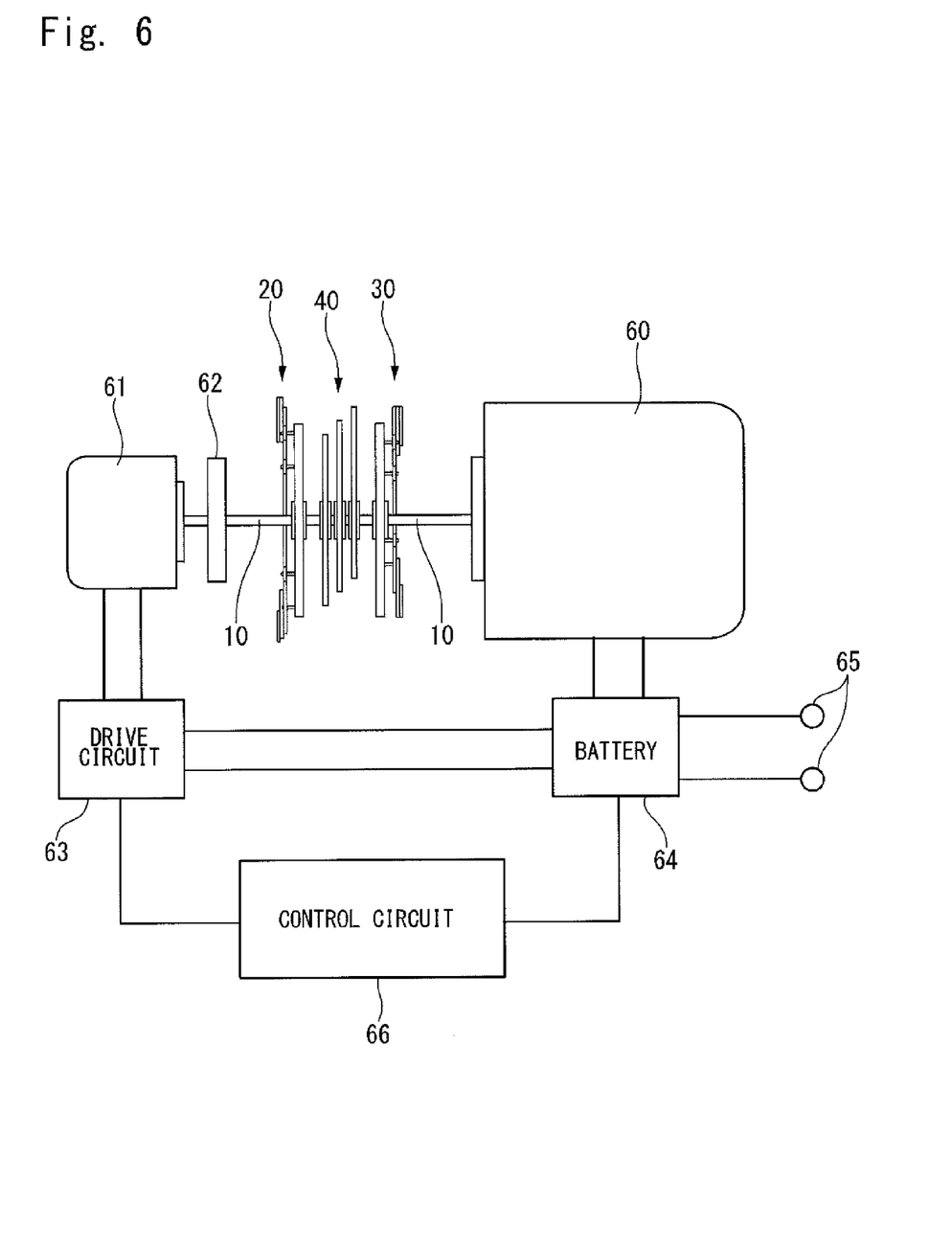
FIG. 6 is a view schematically illustrating a configuration of a power generation system including the rotation maintaining device shown in FIG. 1.

FIG. 6 schematically shows configurations of a power generation system with the aforementioned rotation maintaining device. As shown in the figure, an electrical generator 60 is coupled with the output shaft 10 of the rotation maintaining device. In a modification, a gear mechanism (not shown) for adjusting the rotational rate may be coupled with the output shaft 10 and an output shaft of this gear mechanism may be coupled with the electrical generator 60. An electrical motor 61 for initially driving the rotation maintaining device and for compensating variation in the rotational rate is coupled with the output shaft 10 of the rotation maintaining device through a clutch 62. A drive circuit 63 is electrically connected to the motor 61, and output terminals of a battery 64 capable of charging and discharging is electrically connected to this drive circuit 63.

The electrical generator 60 is configured from for example a three-phase AC generator, and an input terminal of an AC/DC converter (not shown) is electrically connected to three-phase output terminals to obtain a DC output. An input terminal of a DC/DC converter or a power controller (not shown) is electrically connected to an output terminal of the AC/DC converter, and an output terminal of the DC/DC converter or the power controller is electrically connected to the battery 64. The battery 64 or the output terminal of the power controller is electrically connected to an external terminal 65 through a DC/AC converter (not shown) so that generated AC power is provided outside through this external terminal 65. Also, to the drive circuit 63 and the battery 64, a control circuit 66 for controlling operations of this power generation system is electrically connected.

The control circuit 66 drives the electrical motor 61 at the start of driving of the rotation maintaining device, and transmits the generated rotation torque to the output shaft 10 through the clutch 62 to turn the rotation maintaining device. Thereafter, the electrical motor 61 is stopped its driving and the coupling of the clutch 62 with the rotation maintaining device is released. Under these conditions, the rotation maintaining device turns by inertia. The electrical generator 60 is driven by this turn of the rotation maintaining device, generated AC power is converted into DC power, then its voltage is adjusted, and the adjusted DC power is applied to the battery 64 to charge it. A necessary DC power is derived from the battery 64, converted into AC power, and, after adjustment of its voltage, provided through the external terminal 65 outside. During operations, the control circuit 66 detects the rotational rate of the rotation maintaining device by means of a rotational speed sensor (not shown), and drives the electrical motor 61 to transmit its rotational torque to the output shaft 10 of the rotation maintaining device through the clutch 62 when the rotational rate of the rotation maintaining device varies or extremely falls. Thus, such variations or extreme fall in the rotational rate of the rotation maintaining device can be properly compensated.

Many widely different embodiments of the present invention may be constructed without departing from the spirit and scope of the present invention. It should be understood that the present invention is not limited to the specific embodiments described in the specification, except as defined in the appended claims.

The invention claimed is:

1. A rotation maintaining device comprising:
    a rotatable output shaft pivotally supported and provided with an axis running along a horizontal direction that is vertical to a direction of force of gravity;
    a rotatable rotary plate member concentrically coupled with said output shaft;
    a plurality of rotary weight members pivotally supported by said rotary plate member at positions near a peripheral edge of said rotary plate member, respectively, so as to rotate around pivoted axes in only one direction;
    a guide member fixed in motionless condition to position coaxial with said output shaft, and provided with a peripheral side surface having a partially arc shape, said peripheral side surface being positioned at a side where said rotary weight members ride when said rotary plate member rotates; and
    a plurality of rotation engagement members pivotally supported by said rotary plate member so as to rotate around pivoted axes, when outer circumference side surfaces of said rotation engagement members engage with and are guided by the partially arc shaped peripheral side surface of said guide member,
    each of said rotary weight members including a circular plate section having a rotational axis coaxial with the pivoted axis of each rotary weight member, and a weight section fixed to said circular plate section to bias a position of the center of gravity of each rotary weight member from the axis of said circular plate section,
    each of said rotary weight members being adapted to rotate in said one direction when an outer circumference side surface of said circular plate section is engaged with and driven by the outer circumference side surface of each rotation engagement member.

2. The rotation maintaining device as claimed in claim 1, wherein each of said rotary weight members is adapted to rotate by the driving of each of said rotation engagement members when each rotary weight member rises due to rotation of said rotary plate member, and wherein each of said rotary weight members is adapted not to rotate when each rotary weight member falls due to rotation of said rotary plate member.

3. The rotation maintaining device as claimed in claim 2, wherein said device is adapted that a position of the center of gravity of each rotary weight member during rising is nearer to a rotation axis of said rotary plate member than a positon of the center of gravity of each rotary weight member during falling.

4. The rotation maintaining device as claimed in claim 1, wherein each of said rotary weight members is pivotally attached to said rotary plate member by a one-way bearing mechanism that allows to rotate only in one direction.

5. The rotation maintaining device as claimed in claim 1, wherein each of said rotary weight members further comprises an additional weight fixed to said weight section of each rotary weight member, for further biasing the positions of the center of gravity of each rotary weight member.

6. The rotation maintaining device as claimed in claim 1, wherein said plurality of rotary plate members comprise a pair of rotary plate members concentrically coupled with said output shaft and a pair of guided members fixed in motionless condition, and wherein said plurality of rotary weight members and said plurality of rotation engagement members are pivotally supported by each of said rotary plate members, respectively.

7. The rotation maintaining device as claimed in claim 6, wherein said device further comprises a flywheel mechanism concentrically coupled with said output shaft at a position between said pair of rotary plate members.

\* \* \* \* \*